United States Patent Office 3,190,890
Patented June 22, 1965

3,190,890
AROYLALKYLAMINOALKYL DERIVATIVES OF
2,3-POLYMETHYLENEINDOLES
Meier E. Freed, Philadelphia, Pa., Leonard M. Rice, Minneapolis, Minn., and Elizabeth Hertz, Bryn Mawr, Pa., assignors to American Home Products Corporation, New York, N.Y., a corporation of Delaware
No Drawing. Filed July 10, 1963, Ser. No. 294,164
4 Claims. (Cl. 260—319)

This invention is directed in general to certain novel chemical compounds useful in a general as central nervous system moderators, to methods for their manufacture and to their use in pharmacology.

The invention disclosed in its broadest product aspect concerns a class of novel aroylalkylaminoalkyl derivatives of 2,3-polymethyleneindoles which may be generally illustrated by the structural formula:

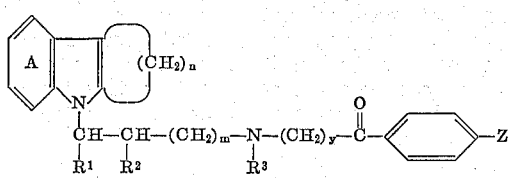

and the pharmaceutically acceptable acide addition salts thereof, where $n$ is an integer from 4 to 13 and preferably from 4 to 8; $R^1$ and $R^2$ each represent either hydrogen or methyl; $m$ is either 0 or 1; $y$ is 2 or 3; $R^3$ is a lower alkyl group, preferably a methyl group and the substituent indicated by Z is a lower alkyl group, preferably methyl, a halogen atom, preferably fluorine, a trifluoromethyl function or a lower alkoxy group, preferably a methoxy substituent.

In the above formula the benzenoid moiety indicated by A may be variously substituted at any available position thereon to yield halogenated analogs such as the 5-chloro and 5-fluoro members; the alkylated analogs such as 5-methylated or 5-ethylated members; and the lower alkoxylated analogs such as the 7- or 5-methoxy substituted analogs all of which would be considered equivalents to the compounds claimed and which would be expected to evince a like activity thereto. Likewise in the broad concept of such compounds as described above, those analogs wherein the benzenoid moiety of the indole nucleus is substituted with such functions as a hydroxy group, a simple amino group, or a nitro group may be obtained by proper selection of starting materials and thus would be expected to fall within the metes and bounds of our invention. When a substituent is present in the "A" ring the 5-position is preferred.

In the definition of the novel compounds of our invention there may be particularly noted those having the formula:

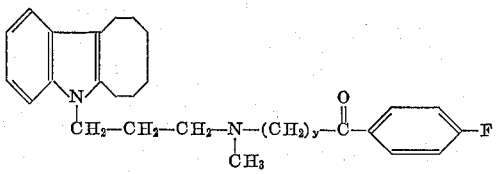

wherein $y$ is 2 or 3 but preferably 3. This compound which is known as 1-(3-[N-(3-p-fluorobenzoylpropyl)-(N-methylamino]propyl)-2,3-hexamethyleneindole is an active anti-tremorine, anti-spasmodic agent when administered to laboratory test animals in doses ranging from 10 to 100 milligrams/per kilogram, which animals are later challenged with 30 milligrams/kilogram of tremorine and then graded at one half hour, 1 hour and 2 hours for degree of tremors, salivation, lacrimation and diarrhea.

As regards the definition of our novel compounds as generally set forth above, the terms "lower alkyl" and "lower alkoxy" where employed are intended to refer to those functions having from 1 to about 6 carbon atoms in the group which may be either normal or branched so as to include typically methyl, ethyl, n-propyl, isopropyl and the like substituents. The novel compounds as generally and specifically illustrated are basic in nature and thus exhibit a capacity for reaction with certain pharmaceutically acceptable acids to form the pharmaceutically acceptable acid additions salts thereof. Any suitable inorganic acid such as hydrochloric, sulfuric, phosphoric and the like or alternatively organic acids such as acetic, fumaric, maleic and the like may be used to form such salts.

The compounds of this invention can be prepared by reacting, under reflux conditions in the presence of a suitable reaction solvent, a properly para substituted ω-haloalkylphenone of the general structure:

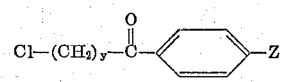

where Z is as defined, with a substituted 1-[ω-alkylaminoalkyl]-2,3- polymethyleneindole which may be represent by the general structure:

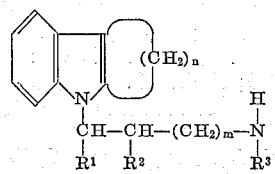

where the functional groups $R^1$, $R^2$ and $R^3$ as well as the symbols $n$, $m$ and $y$ have the values set forth in the above definition of the final products obtained. The reaction is carried out preferably for from about 12 to about 24 hours or until the reaction is complete as indicated by precipitate formation. The product obtained is purified by conventional techniques to obtain the products of the invention. The preparative reaction can be carried out in one of a number of acceptable inert solvents such as aromatic hydrocarbon e.g. toluene or benzene, a lower alkanol e.g. ethanol, butanol and the like or a solvent such as dioxane or acetone at or below the reflux point for the particular solvent employed for up to 36 hours although the reaction time will vary with the particular reactants and solvents employed in the preparation.

The compounds of the invention in the main have useful pharmacological properties. They are active depressants of the central nervous system and in this regard exhibit tranquilizing effects in mammals. In addition to this function many of the compounds of the invention are useful experimental tools in the area of pharmacological evaluation and experimentation techniques wherein various pharmaceuticals are compared and evaluated for effect on the central nervous system of mammals. In the field of veterinary medicine the compounds would be expected to be useful for example when administered orally to household pets, such as dogs or cats which have due to increased age been taken with a stroke or seizure and must be tranquilized. In regard to their central nervous system depressant activity, the compounds of the invention thus would be useful anti-tremorine and anti-spasmodic agents when administered in moderate doses to mammals including man.

The examples set forth below illustrate in detail some of the preferred product and process aspects of our invention in the form of several embodiments of our invention. It will be apparent to those skilled in the art that numerous modifications in methods and materials may be employed without departing from the spirit of the invention. In the following specific examples quantities of materials are given in parts by weight and temperatures in degree centigrade (° C.). It is of course to be understood that the following examples are purely set forth as exemplary of the invention and in no way may be construed to define its metes and bounds. For a proper legal definition of this invention attention must be directed to the several appended claims.

EXAMPLE 1

*1-(3-[N-(3-p-fluorobenzoylpropyl)-N-methylamino]propyl)2,3-hexamethyleneindole*

Reflux a solution of 1-(3-methylaminopropyl)-2,3-hexamethyleneindole (14.9 grams, 0.055 mole) and 4-chloro-p-fluorobutyrophenone (5.8 grams, 0.03 mole) in toluene (225 ml.) for 12 hours, cool and dilute with ether (150 ml.). Remove precipitate by filtration. Concentrate the filtrate under vacuum and take the residue up in ether. Wash with water and extract the ether layer thoroughly with dilute aqueous hydrochloric acid. Make basic the aqueous acid extract and the resulting oil extract into ether. Wash the ether extract (saline) and dry over magnesium sulfate. Remove the solvent, transfer the residue to a distillation apparatus and remove the unreacted 1-(3-methylaminopropyl) - 2,3 - hexamethyleneindole by distillation (B.P. 160–170° C./0.1 mm.). Take up the residual material in ethanol and convert to hydrochloride salt. After recrystallization from ethanol-ether, and from acetone, the product melts at 1.1–4° C.

*Analysis.*—Calc. for $C_{28}H_{36}ClFN_2$: C, 71.39%; H, 7.70%; Cl, 7.53; N, 5.95%. Found: C, 71.69%; H, 7.40%; Cl, 7.50%; N, 6.12%.

EXAMPLE 2

*1-(3[N-propyl-N-(3-p-trifluromethylbenzcylpropyl)amino]propyl)-2,3-tridecamethyleneindole*

Prepare the compound of this example by heating under reflux a solution of 4-chloro - p - trifluoromethylbutyrophenone (1 mole) and 1-[3-propylaminopropyl]-2,3-tridecamethyleneindole (2 mole) in toluene for 24 hours, in the manner of Example 1.

EXAMPLE 3

*1-(3-[N-methyl-N-(3-p-methoxybenzoylpropyl)amino]-2-methylpropyl)-5-chloro-2,3-pentamethyleneindole*

Prepared the compound by heating under reflux a solution of 4-chloro-p-methoxybutyrophenone (1 mole) and 1-(3-methylamino-2-methylpropyl)-5-chloro - 2,3 - pentamethyleneindole (2 moles) in toluene for 24 hours, in the manner of Example 1.

EXAMPLE 4

*1-(3-[N-methyl-N-(2-p-toluoylethyl)amino]propyl)-5-methyl-2,3-hexamethyleneindole*

Prepare the compound for this example by heating under reflux a solution of 3-chloro-p-methylpropiophenone (1 mole) and 1-(3-methylaminopropyl)-5-methyl-2,3 - hexamethyleneindole (2 moles) in toluene for 24 hours, in the manner of Example 1.

We claim:
1. A compound of the formula

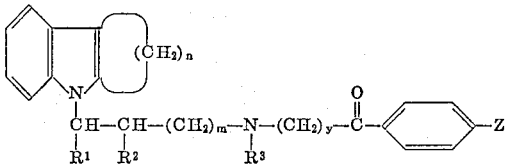

wherein $n$ is an integer from 4 to 13, $R^1$ and $R^2$ each represent a substituent selected from the group consisting of hydrogen and methyl, $m$ is selected from 0 and 1, $R^3$ is lower alkyl, $y$ is selected from the numerals 2 and 3, and Z is a substituent selected from the class consisting of lower alkyl, lower alkoxy, trifluoromethyl and halogen; and the pharmaceutically acceptable acid addition salts thereof.

2. A compound of the structure:

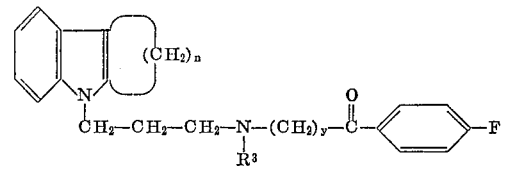

wherein $n$ is an integer from 4 to 13, $R^3$ is lower alkyl; $y$ is selected from the numerals 2 and 3, and the pharmaceutically acceptable acid addition salts thereof.

3. 1-(3-[N-(3-p-fluorobenzoylpropyl)-N-methylamino]propyl)-2,3-hexamethyleneindole.

4. 1-(3-[N-propyl-N-3 - p - trifluoromethylbenzoylpropylamino]propyl)-2,3-tridecamethyleneindole.

References Cited by the Examiner

UNITED STATES PATENTS 2,541,211    2/51    Cusic et al. _____ 260—315

NICHOLAS S. RIZZO, *Primary Examiner.*

WALTER A. MODANCE, *Examiner.*